(12) United States Patent  
Jannotta

(10) Patent No.: US 7,725,273 B2
(45) Date of Patent: May 25, 2010

(54) APPARATUS FOR MONITORING HEIGHT OF LIQUID IN STORAGE TANK

(76) Inventor: Louis J. Jannotta, 7940 Teton Rd., Orland Park, IL (US) 60462

( * ) Notice: Subject to any disclaimer, the term of this patent is extended or adjusted under 35 U.S.C. 154(b) by 66 days.

(21) Appl. No.: 11/985,650

(22) Filed: Nov. 16, 2007

(65) Prior Publication Data
US 2008/0120047 A1    May 22, 2008

Related U.S. Application Data

(60) Provisional application No. 60/859,771, filed on Nov. 17, 2006.

(51) Int. Cl.
*G01F 23/00* (2006.01)
(52) U.S. Cl. .............. 702/55; 702/45; 702/182; 702/188; 702/189; 73/291; 73/290 V; 73/290 R; 73/313; 73/314; 73/317
(58) Field of Classification Search ............. 702/45, 702/50, 55, 100, 182, 188, 189; 73/291, 73/290 V, 313, 1.73, 290 R, 305, 314, 317
See application file for complete search history.

(56) References Cited

U.S. PATENT DOCUMENTS 3,328,591 A    6/1967    Jones
3,525,094 A    8/1970    Leonard (Continued)

FOREIGN PATENT DOCUMENTS

GB            618414        2/1949

OTHER PUBLICATIONS

National Instruments, "Magnetic Encoder Fundamentals", information from website: http://zone.ni.com/devzone/cda/tut/p/id/4500, Oct. 31, 2006.

(Continued)

*Primary Examiner*—Carol S Tsai
(74) *Attorney, Agent, or Firm*—Stout, Uxa, Buyan & Mullins, LLP; Frank J. Uxa

(57) ABSTRACT

An apparatus for monitoring a height of liquid in a liquid storage tank is provided, the apparatus includes a first rotatable element rotatable in response to a change of a liquid level in a liquid storage tank and including a first magnetic component having a first magnetic field, and a second rotatable element rotatable in response to the rotation of the first rotatable element and including a second magnetic component having a second magnetic field. The apparatus further includes a sensor assembly which includes a first sensor component located within range of the first magnetic field and structured to be effective in providing a first signal indicative of a position of the first magnetic component, and a second sensor component located within range of the second magnetic field and structured to be effective in providing a second signal indicative of a position of the second magnetic component. The apparatus further includes a data transmitter/microprocessor assembly in electronic communication with the sensor assembly and structured to be effective in receiving the first and second signals from the first and second sensor components, respectively, and processing said first and second signals into data representing a height of liquid in a liquid storage tank.

34 Claims, 9 Drawing Sheets

U.S. PATENT DOCUMENTS

| | | | |
|---|---|---|---|
| 3,713,738 A * | 1/1973 | Bernhardt | 356/73 |
| 3,808,431 A | 4/1974 | Hedrick | |
| 3,842,268 A | 10/1974 | Cornell | |
| 3,875,406 A | 4/1975 | Holeman | |
| 3,937,083 A | 2/1976 | Sabatino et al. | |
| 3,959,628 A | 5/1976 | Haydon | |
| 4,037,219 A | 7/1977 | Lewis | |
| 4,086,580 A | 4/1978 | Schroeder | |
| 4,137,451 A | 1/1979 | Einolf, Jr. | |
| 4,147,893 A * | 4/1979 | Matson | 379/106.07 |
| 4,275,382 A | 6/1981 | Jannotta | |
| 4,342,996 A * | 8/1982 | Jannotta | 340/870.16 |
| 4,646,085 A | 2/1987 | Mathis | |
| 4,853,694 A * | 8/1989 | Tomecek | 340/621 |
| 5,136,883 A | 8/1992 | Jannotta | |
| 5,374,790 A | 12/1994 | Horvath | |
| 5,511,694 A | 4/1996 | Rohm | |
| 5,705,733 A | 1/1998 | Jannotta | |
| 5,757,180 A | 5/1998 | Chou et al. | |
| 5,811,690 A | 9/1998 | Hershey | |
| 5,866,426 A | 2/1999 | Ball | |
| 5,947,372 A * | 9/1999 | Tiernan | 236/94 |
| 6,037,767 A * | 3/2000 | Crescenzo et al. | 324/220 |
| 6,125,697 A | 10/2000 | Holton et al. | |
| 6,508,118 B1 | 1/2003 | Eck | |
| 6,606,906 B2 * | 8/2003 | Arias | 73/308 |
| 6,649,839 B2 | 11/2003 | Eckert et al. | |
| 6,679,116 B2 * | 1/2004 | Ross, Jr. | 73/317 |
| 6,708,562 B2 | 3/2004 | Krüger et al. | |
| 6,734,667 B2 | 5/2004 | Lorenzen | |
| 6,762,679 B1 * | 7/2004 | Diaz | 340/524 |
| 6,762,897 B1 | 7/2004 | Kabashima et al. | |
| 6,973,828 B2 | 12/2005 | Zimmermann et al. | |
| 6,992,757 B2 | 1/2006 | Holcomb et al. | |
| 7,093,485 B2 | 8/2006 | Newman et al. | |
| 2004/0074297 A1 * | 4/2004 | Sato | 73/313 |
| 2005/0120793 A1 * | 6/2005 | Cochran et al. | 73/313 |
| 2006/0000279 A1 | 1/2006 | Jamnia et al. | |
| 2006/0169687 A1 | 8/2006 | Geockner et al. | |
| 2006/0256498 A1 * | 11/2006 | Smith et al. | 361/232 |

OTHER PUBLICATIONS

Rotary encoder—Wikipedia, the free encyclopedia, "Rotary encoder", information from website: http://en.wikipedia.org/wiki/Rotary_encoder, Oct. 26, 2006.

Austriamicrosystems—AS5040 "10-bit 360° Programmable Magnetic Rotary Encoder", Data Sheet, product information from website: http://www.austriamicrosystems.com, 28 pages, Oct. 3, 2006.

Austriamicrosystems AG—Rotary Encoders—AS5040, "10-bit Programmable Magnetic Rotary Encoder", product information from website: http://www.austriamicrosystems.com/03products/products_detail/AS5040..., 3 pages (Application page, Description page and Fact Sheet), Oct. 26, 2006.

Austriamicrosystems AG—Rotary Encoders—AS5043, "10-bit programmable 360° magnetic angle encoder with absolute digital and analog outputs", product information from website: http://www.austriamicrosystems.com/03products/products_detail/AS5043..., 2 pages (Applications page and Description page), Oct. 26, 2006.

Austriamicrosystems product information—AS5000 Series Programmable Magnetic Rotary Encoder Hardware/Software Compatibility Overview, Revised Apr. 11, 2006, 2 pages.

Austriamicrosystems product information—AS50xx Family of Magnetic Rotary Encoders, Recommended Magnets, Revised Mar. 30, 2006, 2 pages.

Preliminary Report on Patentability dated May 28, 2009 in related PCT Application No. PCT/US2007/024117.

* cited by examiner

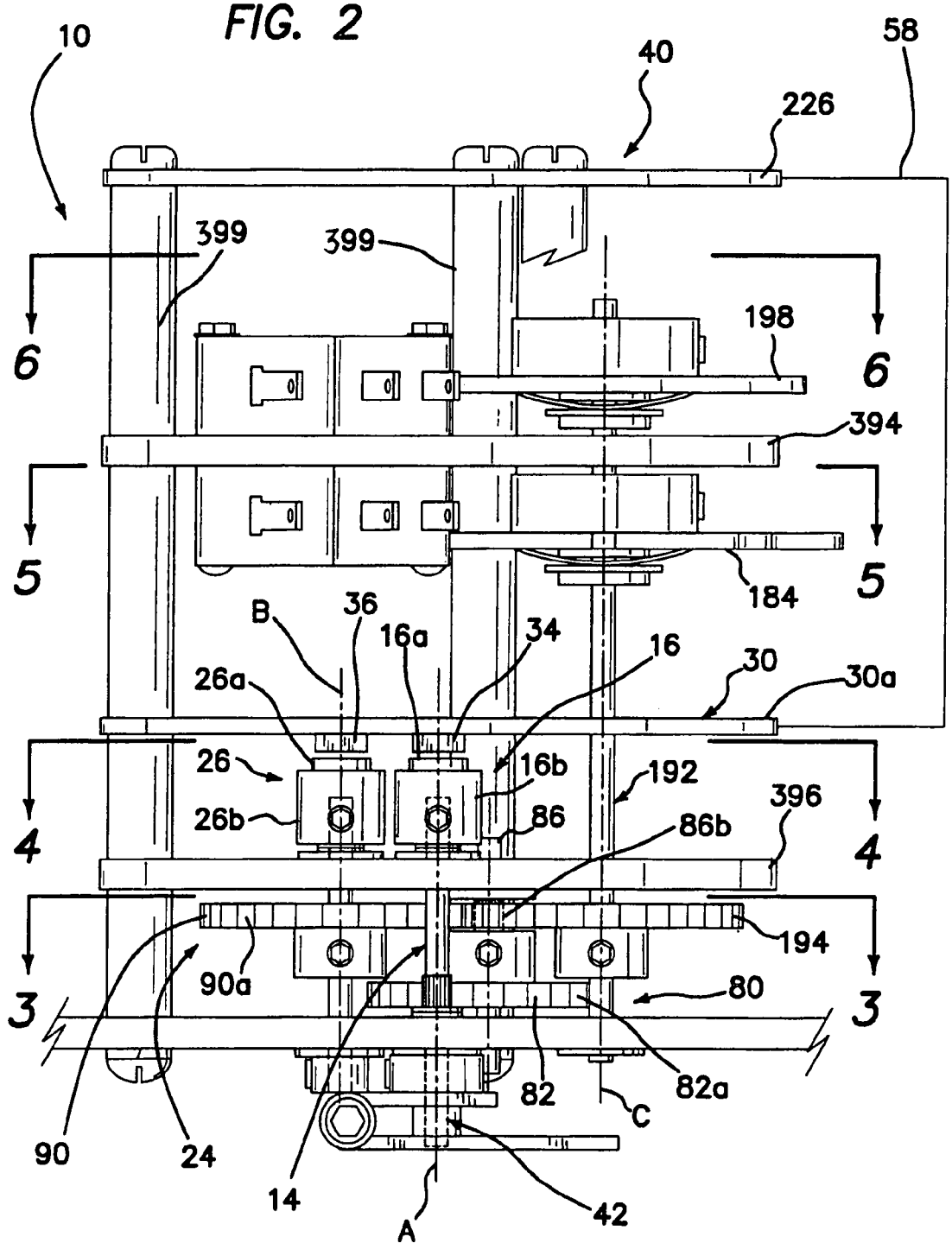

APPARATUS FOR MONITORING HEIGHT OF LIQUID IN STORAGE TANK

RELATED APPLICATION

This application claims the benefit of U.S. Provisional Patent Application No. 60/859,771, filed on Nov. 17, 2006, the entire disclosure of which is incorporated herein by this reference.

BACKGROUND

The present invention generally relates to apparatus and systems for determining or monitoring the height or level of a liquid in a vessel, for example and without limitation, a storage tank. More particularly, the invention relates to apparatus and systems which obtain and process, for example, translate, signals into the absolute height or level of liquid over at least a portion of the total height of liquid-containing vessel, such as a liquid storage tank.

The height of liquid in a storage tank has been conventionally determined using a float-type mechanical gage. The float, which moves up and down in response to changes in liquid height, is attached to a gage shaft which rotates in response to the movement of the float. Thus, by calibrating the rotational position of the gage shaft with various heights or levels of liquid, the liquid height or level at any given time can be determined or monitored by observing the rotational position of the gage shaft.

In many situations, liquid heights in a great many tanks, e.g., 50 to 100 or more tanks, need to be determined or monitored at the same time. Therefore, it is desirable to provide a system for obtaining liquid height information with respect to each of a plurality of individual storage tanks so that such information can be transmitted to a central receiving or monitoring station.

Various shaft position monitoring systems have been suggested in the prior art. Examples, without limitation of such systems are disclosed in the following U.S. Pat. Nos. 4,137,451; 4,086,580; 4,037,219; 3,959,628; 3,875,406; 3,842,268; 3,808,431; 3,525,094; and 3,328,591.

Devices that have been highly useful and effective in providing accurate measurement of height of liquids in multiple storage tanks are described in Jannotta, U.S. Pat. No. 4,342,996. Such devices, for example, sold by L&J Engineering, Inc., under the trademark L&J Engineering, MCG 2000F, employ light signal sources and coded, rotatable discs which provide different light patterns which are detected by light signal detectors. The detected patterns of light signals are translatable into the height of a liquid in a liquid storage tank. Thus, such a device is used in conjunction with a storage tank which is equipped with a height (or level) gage including a gage shaft which is rotatable in response to changes in the height (or level) of the liquid in the tank. The device includes an instrument shaft which is capable of being associated with the gage so as to be rotatable in response to rotation of the gage shaft.

There is a need for new systems and apparatus for monitoring or determining the height or level of a liquid in liquid-containing vessels, such as a liquid storage tank.

SUMMARY OF THE INVENTION

New apparatus for monitoring or determining a height, for example, the absolute height, of a liquid in a liquid storage tank have been discovered. The apparatus are especially useful in conjunction with a large number of liquid storage tanks, such as gasoline and oil tanks on so-called "tank farms", storage tanks used in waste water treatment facilities, chemical storage tanks, fresh water storage tanks and the like.

Liquid storage tanks are commonly equipped with a mechanical liquid level gage having a gage shaft which rotates in response to changes in the height or level of the liquid in the tank. The present apparatus are very useful in conjunction with a storage tank which is equipped with a height (or level) gage including a gage shaft which is rotatable in response to changes in the height (or level) of the liquid in the tank.

In a broad aspect of the present invention, an apparatus for monitoring, determining and/or transmitting a height (or level) of liquid in a liquid storage tank, for example, as discussed elsewhere herein, is provided. The apparatus comprises a first rotatable element comprising a first magnetic component that is rotatable in response to a change in a height of liquid in a liquid storage tank, and a second rotatable element comprising a second magnetic component that is rotatable in response to the rotation of the first rotatable element. The apparatus further comprises a sensor assembly comprising a first sensor component located within range of the first magnetic field of the first magnetic component and structured to be effective in providing a first signal indicating a position, such as a rotational position, of the first magnetic component; and a second sensor component located within range of the second magnetic field of the second magnetic component and structured to be effective in providing a second signal indicating a position, such as a rotational position, of the second magnet component. A data transmitter/microprocessor assembly is provided and is structured to be effective in receiving and processing the first and second signals into data representing a height, such as an absolute height, of liquid in a liquid storage tank.

In some embodiments of the invention, the apparatus further comprises a shield assembly structured and positioned to be effective to increase the accuracy or degree of resolution obtainable by the present apparatus. In a particularly useful embodiment, the shield assembly comprises first and/or second shield element(s) structured and positioned relative to the first magnetic component/sensor component and/or the second magnetic component/sensor component, respectively, to be effective in reducing, or even substantially eliminating, magnetic interference within the first and/or second magnetic field, respectively, relative to an identical apparatus without the first and/or second shield element(s). The shield assembly may be structured and positioned to be effective in increasing resolution obtainable by the present apparatus up to about 4 times or more relative to an identical apparatus without the shield assembly.

In one embodiment, the first and/or second sensor component(s) comprise a magnetic rotary encoder, such as a programmable magnetic rotary encoder. A very useful programmable magnetic rotary encoder is a so-called "system-on-chip" programmable magnetic rotary encoder.

In one embodiment, the first and/or second sensor component comprises a 6-bit, 8-bit, 10-bit, 12-bit or higher programmable magnetic rotary encoder.

In some embodiments of the invention, the apparatus further comprises a gear assembly positioned to operatively couple together the first and second rotatable elements. The gear assembly has a desired gear ratio and may be structured to cause the first rotatable element to rotate between about 8 to about 3000 or more, and preferably about 10 to about 200 or about 2100, full revolutions for one (1) full revolution of the second rotatable element. In one embodiment, the gear assembly is structured to cause the first rotatable element to rotate 96 or 128 full revolutions for one (1) full revolution of the second rotation.

The present apparatus further comprise a switch assembly, for example, functionally integrated with or operatively coupled to the gear assembly. The switch assembly may comprise one or more, for example up to about four or more switches, for example, cam switches. Each switch may be structured to trigger or activate an alarm, pump or other useful device, for example, based on the height of liquid in the liquid storage tank being monitored by the present apparatus.

The present apparatus are advantageously structured to be highly compact and sturdy. For example, the sensor assembly may comprise an encoder board, for example, a disc-shaped encoder board, to which the first and second sensor components are secured, for example, fixedly secured, in a spaced apart relationship. The data transmitter/microprocessor assembly may comprise a data transmitter/microprocessor board spaced apart from the encoder board and advantageously similar in size and/or shape thereto. For example, the encoder board and the data transmitter/microprocessor board may be positioned in a spaced-apart, stacked relationship relative to one another.

The present apparatus may further comprise a data display assembly including a display screen located in a stacked relationship with the data transmitter/microprocessor board. One or more switches, for example, rotatable cam switches, may be located between the encoder board and the data transmitter/microprocessor board.

In a very useful embodiment, the apparatus is operational using a reduced, for example, an almost negligible, amount of power, such as electrical power. For example, the apparatus may be structured to operate in a low power mode and read the sensor components on an intermittent basis. In one embodiment, the apparatus further comprises a power supply assembly including a storage capacitor and a switching power supply operatively coupled thereto. In some embodiments, the storage capacitor and the switching power supply may be located on the data transmitter/microprocessor board. The sensor assembly, for example, the magnetic encoders of the sensing assembly, are capable of being read very quickly and may be intermittently powered only a small fraction, for example, less than about 20% or less than about 10% or less than about 5%, such as about 1%, of the total time the apparatus is in service. In one embodiment, such intermittent operation is provided using a transistor switch which is turned on only when the sensor components, for example, the magnetic encoders, are being read. Because of the reduced, even exceptionally low, power requirements of some embodiments of the present apparatus, such embodiments may be run on battery power and/or solar power. Such reduced power requirements facilitate the apparatus being structured to enable remote, wireless operation.

In another broad aspect of the invention, an apparatus for monitoring a height of liquid in a liquid storage tank comprises a rotatable element, a sensor assembly, a power supply assembly and a data transmitter/microprocessor assembly. The rotatable element is rotatable in response to a change of a liquid level in a liquid storage tank and includes a magnetic component having a magnetic field. The sensor assembly includes a magnetic sensor component located within range of the magnetic field of the magnetic component and structured to be effective in providing a signal indicative of a position of the magnetic component. The power supply assembly is structured and positioned to intermittently provide power to the sensor assembly. The data transmitter/microprocessor assembly is in electrical communication with the sensor assembly and is structured and positioned to be effective in receiving the signal from the magnetic sensor component and processing said signal into data representing a height of liquid in a storage tank.

Substantial, unexpected and unpredictable advantages are obtained with the present apparatus, for example, relative to systems utilizing light signals and patterns to monitor liquid levels. For example, the use of magnetic components and magnetic sensor components provides significant enhancements in accuracy (degree of resolution) and reliability of liquid height measurement in a storage tank over conventional systems, for example, those systems utilizing light signals and patterns. The present apparatus have been found to produce higher resolution liquid level monitoring, as well as to be less prone or susceptible to malfunctioning due to dust, grease or debris collecting on the components of the apparatus, and to be less expensive to operate and maintain, for example, relative to the above-noted conventional systems. The present apparatus have the further advantage of not being affected by extraneous visible light. Also, the present apparatus can operate using substantially reduced amounts of power, for example, electrical power, thus providing cost savings and improved safety, in particular when used to monitor the liquid height in a storage tank containing a flammable liquid. The low power consumption of the present apparatus advantageously facilitates using a battery and/or solar energy as a power source, which can further reduce costs and avoid using commercial electrical power.

Moreover, in certain embodiments, the present apparatus can be activated for use during only a small portion of the total time which reduces costs and enhances safety. The reduced energy requirement/consumption of the present apparatus also facilitates wireless operation of the apparatus and, thus provides additional advantages which come with such wireless operation.

In short, the present apparatus are more accurate and/or more reliable and/or produce higher resolution liquid level monitoring and/or are less prone to malfunctioning and/or are less expensive to operate and maintain and/or are not affected by extraneous visible light and/or operate at reduced power requirements/consumptions relative to conventional liquid level monitoring systems, for example, as described elsewhere herein.

Various embodiments of the present invention are described in detail in the detailed description and additional disclosure below. Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, examples, and additional disclosure.

BRIEF DESCRIPTION OF THE DRAWINGS

FIG. 2 is a side view of a portion of the apparatus shown in FIG. 1.

DETAILED DESCRIPTION OF THE INVENTION

Figure 1:
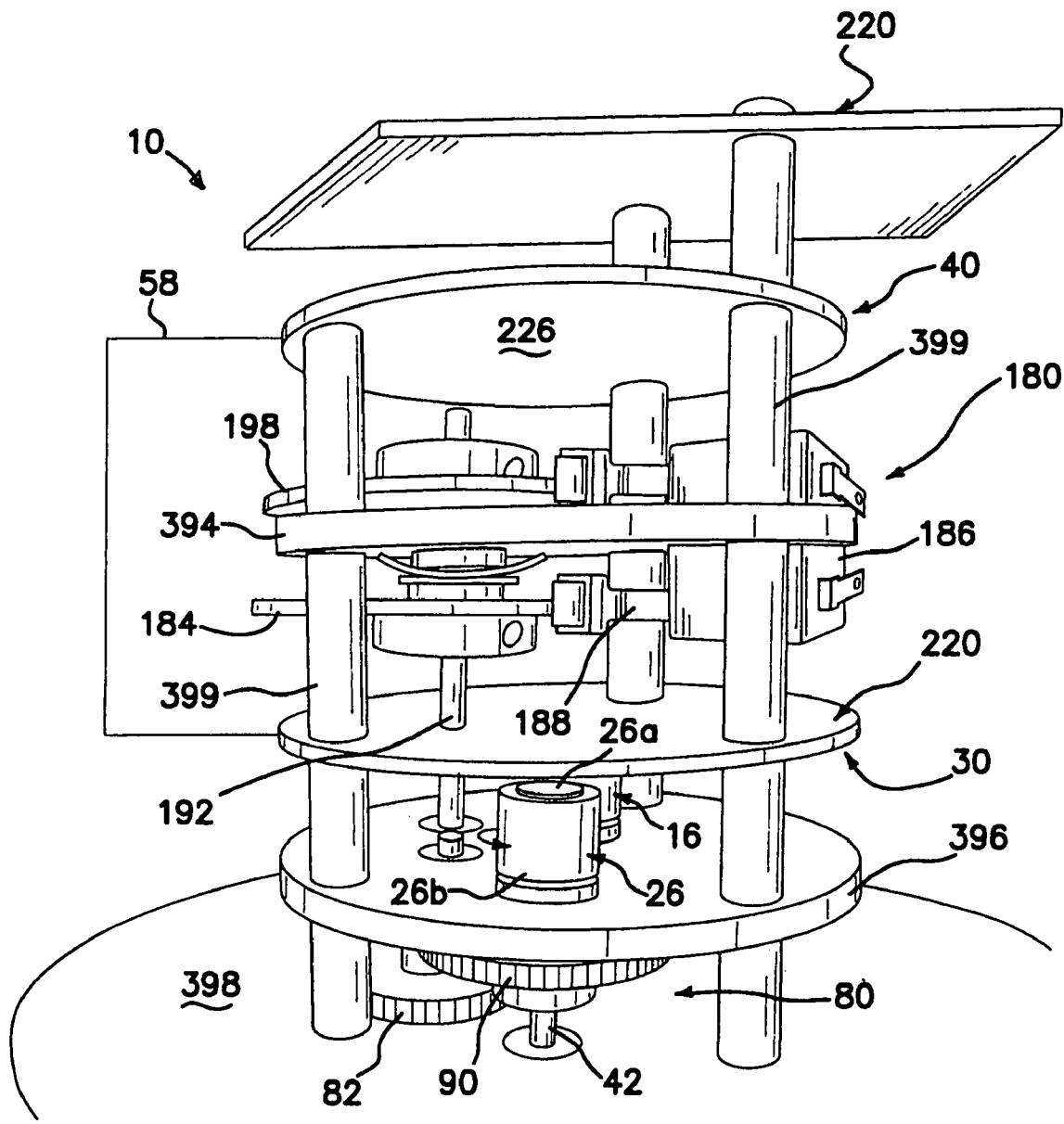
FIG. 1 is a perspective view of one embodiment of an apparatus for monitoring a height of liquid in a liquid storage tank in accordance with the invention.
Figure 2A:
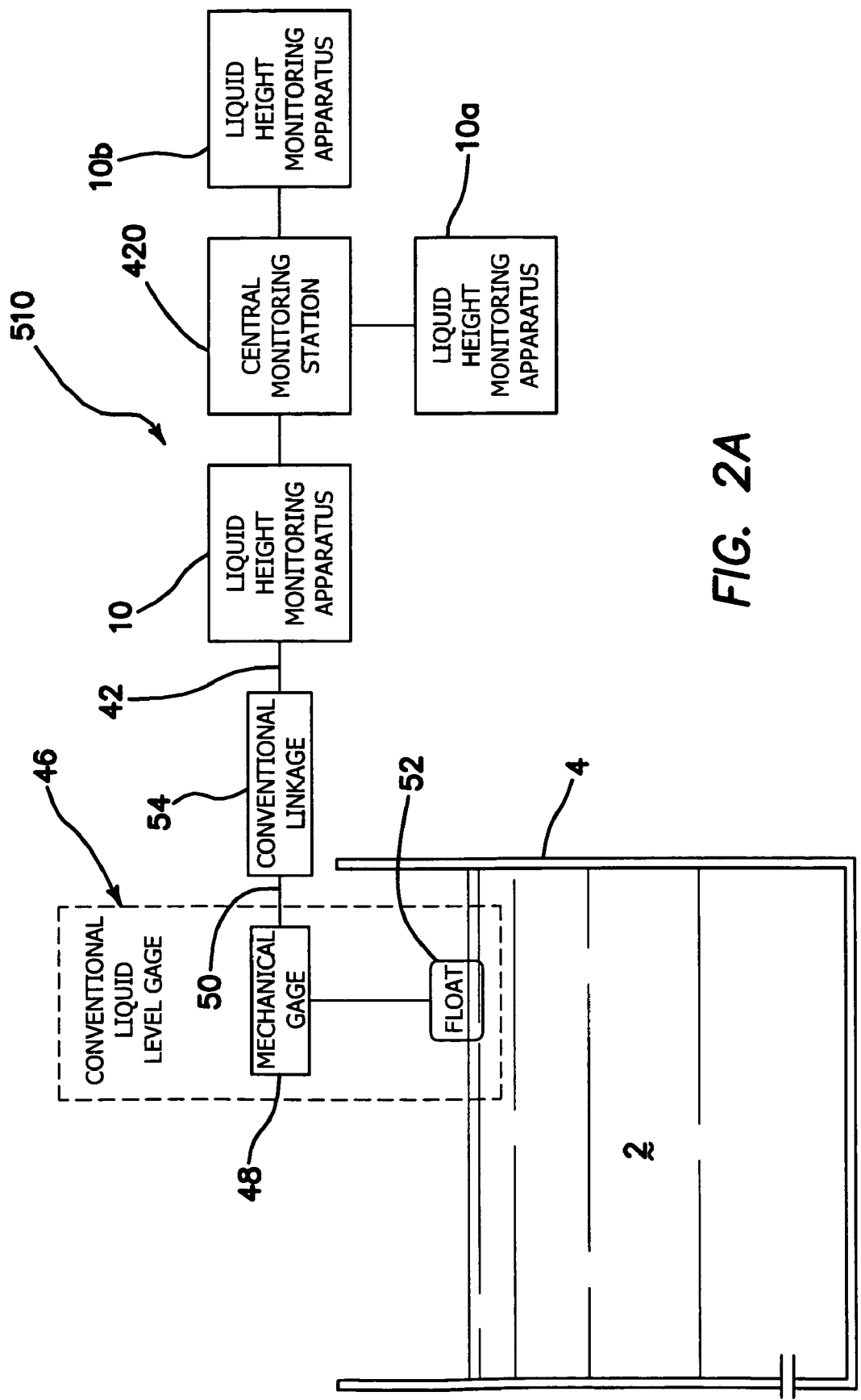
FIG. 2A is a simplified diagram showing the apparatus shown in FIG. 1 in use in monitoring the height or level of liquid in a liquid storage tank.

Turning now to FIGS. 1, 2 and 2A, an apparatus for monitoring a height of liquid 2 in a liquid storage tank 4 is shown generally at 10. Referring specifically to FIGS. 1 and 2, the apparatus 10 generally comprises a first rotatable element 14 rotatable in response to a change of a liquid level in a tank (not shown in FIGS. 1 and 2). The first rotatable element 14 includes a first magnetic component 16 having a first magnetic field, and rotates with the first rotatable element 14. A second rotatable element 24 is provided and is rotatable in response to the rotation of the first rotatable element 14. The second rotatable element 24 includes a second magnetic component 26 having a second magnetic field, and rotates with the second rotatable element 16.

The apparatus 10 further comprises a sensor assembly 30 capable of detecting the first and second magnetic fields. More specifically, as shown in FIG. 2, the sensor assembly 30 generally comprises a first sensor component 34 located within range of the first magnetic field of the first magnetic component 16. The first sensor component 34 is structured to be effective in providing a signal indicative of a position, for example, a rotational position relative to the first sensor component 34, of the first magnetic component 16. The sensor assembly 30 further includes a second sensor component 36 located within range of the second magnetic field of the second magnetic component 26. The second sensor component 36 is structured to be effective in providing a signal indicative of a position, for example, a rotational position relative to the second sensor component 36, of the second magnetic component 26.

The apparatus 10 further comprises a data transmitter/microprocessor assembly 40 in electronic or electrical communication with the sensor assembly 30. Data transmitter/microprocessor assembly 40 is structured to be effective in receiving the signals from the first and second sensor components 34 and 36, respectively, and processing such signals into data representing the absolute height or level of liquid in the liquid storage tank with which apparatus 10 is associated, such as liquid storage tank 4. In other words, signals from the sensor assembly 30 are decoded at data transmitter/microprocessor assembly 40, using standard techniques and algorithms known in the art, to obtain the absolute height or level of the liquid in the tank 4, in feet and inches, meters and centimeters or millimeters, or other appropriate standard units.

Turning specifically to FIG. 2A, when the apparatus 10 is in use monitoring the height or level of liquid 2 in liquid storage tank 4, the apparatus 10 is coupled by an input shaft 42 (as shown in FIGS. 1 and 2) to a conventional liquid level gage assembly 46. The liquid level gage assembly 46 may comprise a mechanical gage 48, output shaft 50, and a float 52, or other suitable element, coupled to the mechanical gage 48. Conventional linkage 54 connects the output shaft 50 of the mechanical gage 48 to input shaft 42 of apparatus 10. The float 52 moves up or down in the tank 4 as the fluid level changes. The vertical motion of the float 52 is translated into rotational motion of output shaft 50 which effects rotation of the input shaft 42 through linkage 54. Thus, changes in the height or level of liquid 2 in tank 4 cause vertical movement of float 52 which results in rotational movement of input shaft 42 in response to the motion of the float 52.

The liquid 2 in tank 4 may be water, gasoline, oil, paint, or any suitable liquid the height or level of which is desired to be monitored. The liquid 2 may be a homogenous fluid or a stratified fluid comprising layers of different materials, for example, materials having different densities. In some instances, the float 52 can be suspended at an interface between two layers of different materials. For example, the float 52 can be suspended on a top surface of a layer of oil overlying layers of wax, heavy hydrocarbon, or water beneath.

Figure 3:
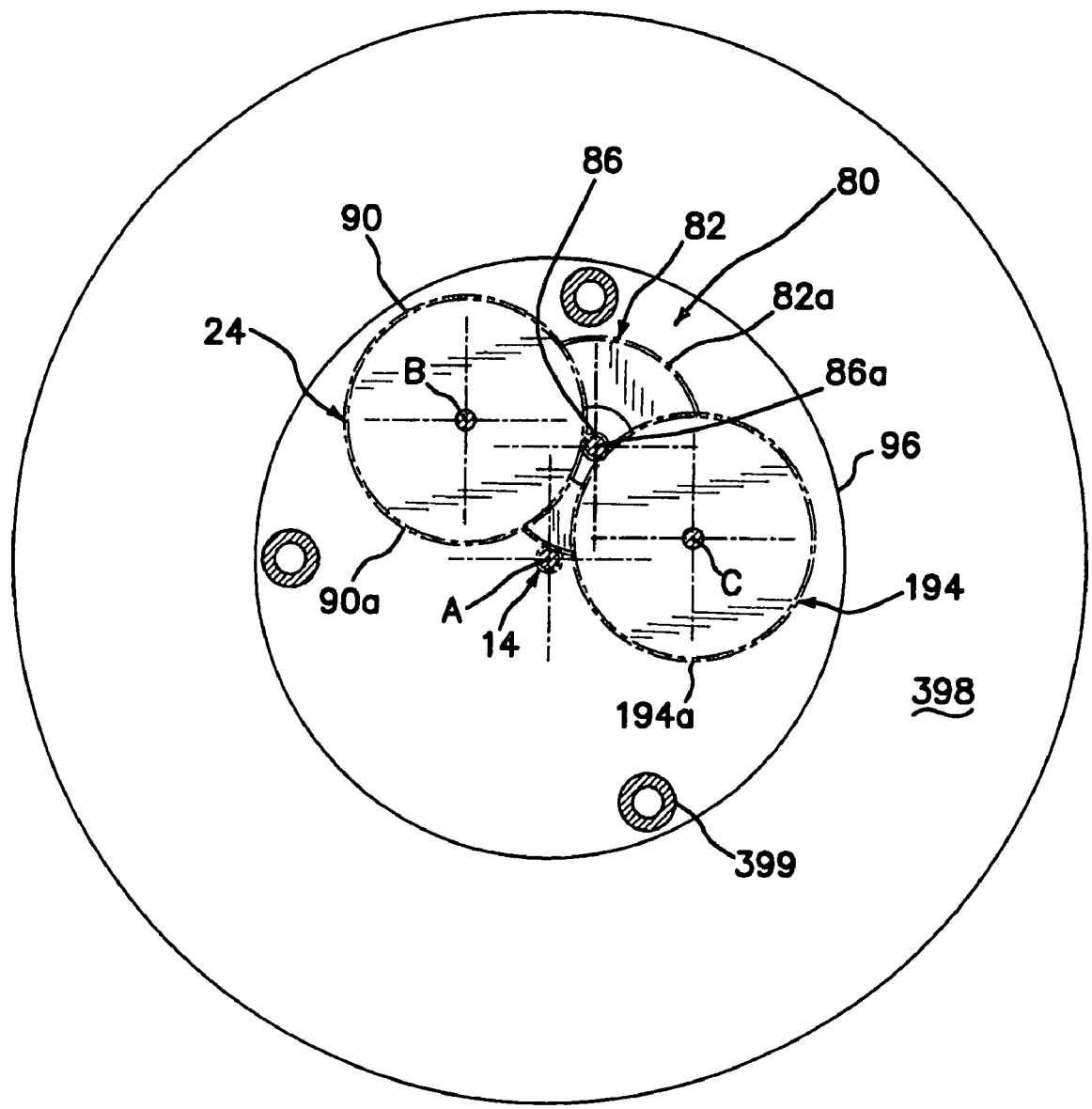
FIG. 3 is a cross-sectional plan view of the apparatus shown in FIG. 2 taken along line 3-3.

Referring now to FIGS. 1, 2 and 3, in the embodiment shown there is a one-to-one relationship between the rotational movement of first rotatable element 14, which may be directly linked with input shaft 42, and the rotational movement of the input shaft 42. The second rotatable element 24 rotates at a different rate from first rotatable element 14, the rotational rate of the second rotatable element 24 being proportional to the rotational rate of the first rotatable element 14. The input shaft 42, first rotatable element 14 and first magnetic component 16 rotate axially about center line A indicated in FIGS. 2, 3 and 4. The second rotatable element 24 and second magnetic component 26 rotate axially about center line B indicated in FIGS. 2, 3 and 4.

The apparatus 10 further comprises a gear assembly 80 having a desired gear ratio. The gear assembly 80 is structured and positioned to operatively couple together the first and second rotatable elements 14, 24 to provide the desired gear ratio. For example, the gear assembly 80 may be structured to cause the first rotatable element 14 (and consequently the first magnetic component 16) to rotate between about 8 and about 2048 full revolutions for 1 full revolution of the second rotatable element 24 (and second magnetic component 26), or between about 16 and about 1024 full revolutions for 1 full revolution of the second rotatable element.

For example, in a specific embodiment of the invention, gear assembly 80 may comprise first gear element 82 having first teeth 82a. First rotatable element 14 includes gear teeth which mesh with first teeth 82a of first gear element 82. First gear element 82 may comprise a secondary shaft 86 including second gear teeth 86a (see FIG. 2). Second rotatable element 24 may comprise a second gear element 90 having gear teeth 90a which mesh with second gear teeth 86a of the secondary shaft 86 of first gear element 82. Second gear element 90 may be concentric with and coupled to the second rotatable element 24 and second magnetic component 26 such that the second magnetic component 26 rotates with second gear element 90.

Generally speaking, the gear assembly 80 may have a gear ratio of between about 1:8 to about 1:2048, that is, for every complete rotation of second rotatable element 24 and second magnetic component 26, the first rotatable element 14 and first magnetic component 16 will have rotated between about 8 to about 2048 complete rotations. In specific embodiments, the gear ratio as defined above, may be about 1:96, 1:128, or 1:1024.

As shown perhaps most clearly in FIG. 2, first magnetic component 16 is mounted to an end, e.g., top end, 14 of the first rotatable element 14 in a substantially centered, spaced apart relationship with respect to first sensor component 34. Similarly, second magnetic component 26 is mounted to an end, e.g., top end, of second rotatable element 24 in a substantially centered, spaced apart relationship with respect to second sensor component 36.

Figure 4:
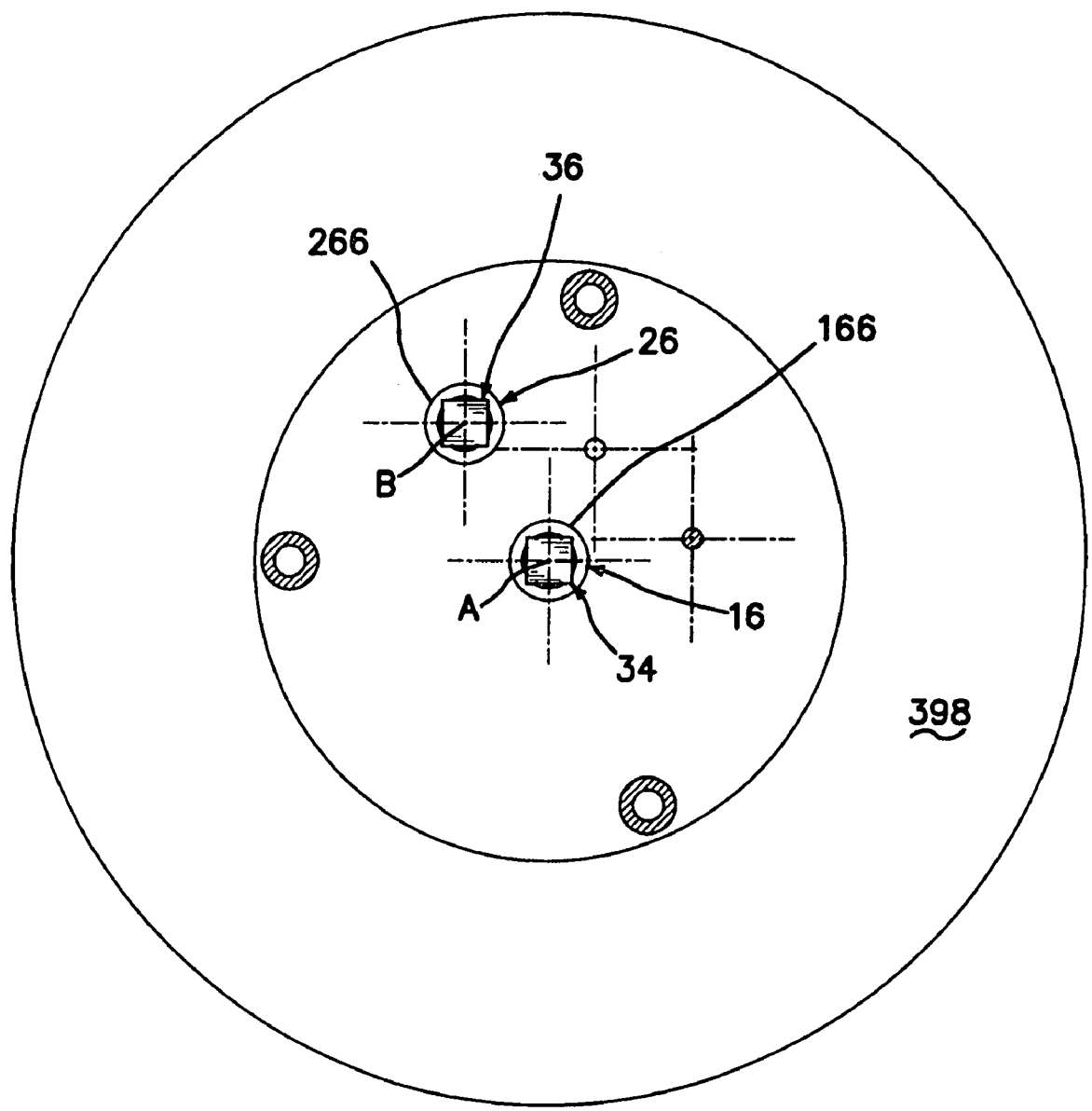
FIG. 4 is a cross-sectional plan view of the apparatus shown in FIG. 2 taken along line 4-4.

As shown in FIGS. 1, 2 and 4, each of the first and second magnetic components 16, 26 may comprise a standard or conventional magnet 16a, 26a and a holding structure 16b and 26b, respectively, which are structured to secure each magnet 16a and 26a to its respective first and second rotatable elements 14, 24.

As mentioned briefly elsewhere herein, the sensor assembly 30 preferably comprises first sensor component 34 and second sensor component 36. Referring now to FIGS. 2 and 4, at least one of the first sensor component 34 and the second sensor component 36 comprises a magnetic rotary encoder and the sensor assembly 30 comprises an encoder board 30a to which the first and second sensor components 34, 36 are fixedly secured. Each of the first and second sensor components 34, 36 are capable of sensing a distribution or orientation, for example, rotational or angular orientation, of the first magnetic field of first magnetic component 16 and the second magnetic field of second magnetic component 26, respectively. Each of the first and second sensor components 34, 36 is further effective in providing an output signal, which may be passed to the data transmitter/microprocessor assembly 40, for example by line 58 (see also FIG. 7), representative of the orientation, specifically rotational or angular orientation, of the respective first or second magnetic component 16 or 26 based on the sensed distribution or orientation of the magnetic field.

Each of first and second sensor components 34, 36 may comprise a programmable magnetic rotary encoder, such as a programmable system-on-chip encoder, a 10-bit programmable magnetic encoder and the like components, a number of which components are commercially available and/or well known.

Such programmable magnetic rotary encoders are conventional and are effective to provide, with a high degree of accuracy, absolute measurement of position, for example, rotational or angular position, of a magnet rotating over or under the rotary encoder, for example, over or under the center of the rotary encoder.

Each of the sensor components 34, 36 may be a contactless magnetic rotary encoder structured to be able to detect, for example, substantially precisely detect, the position, for example, the angular or rotational position of a magnet positioned over or under the center of the magnetic rotary encoder. For example, each of the first and second sensor components 34, 36 is a magnetic rotary encoder structured to provide a signal indicative of the corresponding magnetic component's position, advantageously with a resolution within a range of less than about 1.0° per revolution, more preferably within a range of about 0.05° or less to about 0.2° or about 0.35° or about 0.5°. In a specific embodiment, each of the first and second sensor components 34 and 36 is structured and positioned to be effective in providing a signal indicative of the corresponding magnetic component's position, e.g., angular or rotational orientation relative to the corresponding sensor component, with a resolution of about 0.35°, which is equivalent to about 1024 positions or radial increments per full revolution of the magnetic component.

A particularly useful magnetic rotary encoder for use as the first sensor component 34 and/or the second sensor component 36 in the present apparatus 10 is an 8 bit or higher, for example, a 10 bit, 12 bit, 13 bit or higher, 360° programmable magnetic rotary encoder. For example, the encoder may be a magnetic rotary encoder available from Austriamicrosystems AG and having Model no. 5040, or a magnetic rotary encoder available from Renishaw, Inc., Chicago, Ill. Other conventional magnetic rotary encoder devices are known in the art which are suitable for practicing the present invention.

Each of the first and second magnetic components 16, 26 for use with each of the respective first and second sensor components 34, 36, may comprise any suitable magnet 16a and 26a useful in conjunction with the respective sensor component 34, 36. For example, and without limitation, if each sensor component 34, 36 is a programmable, contactless magnetic rotary encoder as known in the art and described elsewhere herein, each magnetic component 16, 26 may comprise a diametrically magnetized magnet, for example, a cylindrical, two-pole standard magnet, such as a two-pole standard magnet having a diameter of about 6 mm.

In one embodiment, each of the first and second sensor components 34, 36 may include integrated Hall elements, for example, conventional Hall effect elements, placed around the center of the sensor component. The Hall elements are effective in delivering a voltage representation of the magnetic field at the surface of the sensor component 34, 36.

When in use in the apparatus 10 of the present invention, each sensor component 34, 36 senses the distribution or orientation of the magnetic field of the corresponding first or second magnetic component 16, 26 and converts this into a distinct binary code, for example, a distinct 10-bit binary code. This code can be accessed by means of a synchronous serial interface (SSI) which produces a signal representing the position, for example, the angular or rotational orientation of the magnetic component 16 or 26 relative to the sensor component 34 or 36, respectively. More specifically, a representation of the position of the first magnetic component 16 relative to the first sensor component 34 is output from the first sensor component 34 as a signal, for example, a pulse width modulated signal or a synchronous serial signal.

Through signal-delta analog/digital conversion and/or digital signal processing algorithms, each sensor component 34, 36 provides accurate, high resolution position information regarding the absolute position of the magnetic component 16, 26 with respect to the sensor component 34, 36, respectively, which is translated into a value of the absolute measurement of the height of liquid 2 in the tank 4.

In one aspect of the invention, the data transmitter/microprocessor assembly 40 is structured to use the position indicated by at least one of the first signal and the second signal to adjust the value of the height of liquid in the liquid storage tank to a different value relative to the value provided by the positions indicated by the first signal and the second signal without said adjustment.

For example, a software algorithm may be used which provides that if the fractional part of the feet indicated is, for example, a value less than from about 0.25 feet or less than about 0.375 feet, for example, less than about 0.125 feet, and the inches (or other units based on the position identified by the first sensor component 34) indicated is, for example, at a value greater than about 6 inches, than a value of one (1) foot is subtracted from the feet value and the inch value is left as is. This enhances the integrity of the apparatus in measuring a liquid level in a tank.

To illustrate, first magnetic sensor component 34, upon sensing the position of first magnetic component 16, identified that position by a number between 1 and 1024, with each number representing an equal fraction of a foot, i.e., the number 512 represents about six (6) inches. Second sensor component 36, upon sensing the position of second magnetic component 26, identifies that position by a number between 1 and 1024 representing an equal number of feet times 8, i.e., the number 40 represents 5 feet. For example, if first sensor component 34 is sending 939 (which is about 11 inches) and second sensor component 36 is sending 41 which would be about 5.125 feet, the data transmitter/microprocessor assembly 40 converts or corrects the reading to 4 feet 11 inches.

It will be appreciated by those of skill in the art that a distinct and different magnetic field distribution of the first magnetic component 16 is detected by the first sensor component 34 for each incremental rotational position of the first magnetic component 16. Similarly, a distinct and different magnetic field distribution is detected by second sensor component 36 for each incremental rotational position of the second magnetic component 26. The magnetic field distribution signals received by first and second sensor components 34 and 36 are translated to provide an accurate indication of the position, for example, angular or rotational position, of each of first and second magnetic components 16 and 26 with respect to the first and second sensor devices 34, 36, respectively.

With appropriate modifications to the apparatus 10 as will be appreciated by those of skill in the art, other suitable magnetic components and sensor components may be useful in the apparatus of the present invention and such modifications are considered to be within the scope of the present invention.

Figure 4A:
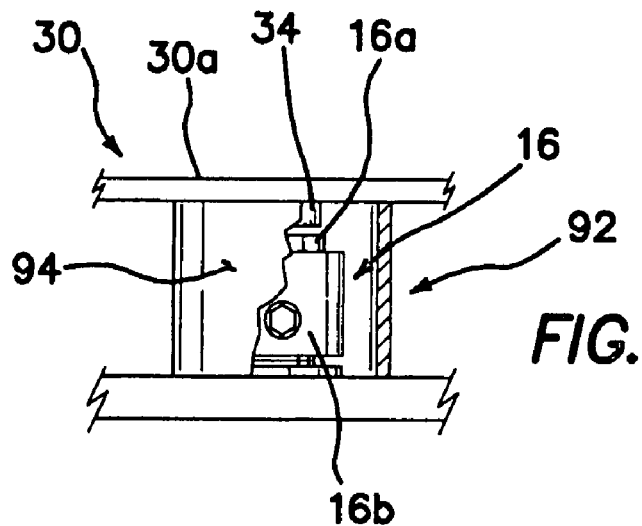
FIG. 4A is a partially cut-away view of one embodiment of a magnetic shield element in accordance with the present invention.

FIG. 4A shows an optional feature of some embodiments of the invention. In such embodiments, the apparatus 10 may further include structure, for example, a shielding assembly 92, positioned and structured to be effective in reducing, or even substantially preventing magnetic interference within the magnetic field of the individual magnetic component 16 or 26, which magnetic interference can adversely affect the position sensed by sensor components 34, 36, and ultimately adversely affect the accuracy of the liquid level measurement obtained in apparatus 10.

For example, apparatus 10 may further comprise a first shield element 94 positioned relative to the first magnetic component 16 and the first sensor component 34 to be effective in reducing or even substantially preventing, magnetic interference within the first magnetic field relative to an identical apparatus without the first shield element. The shield element 94 may be substantially cylindrical in form. The shield element 94 may be secured to the sensor assembly 30 as shown. The shielding assembly 92 may further comprise a second shield element identical to first shield element 94 and which is positioned relative to the second magnetic component 26 and the second sensor component 36 to be effective in reducing, or even substantially preventing magnetic interference within the second magnetic field relative to an identical apparatus without the second shield element. Sensor component 36 and its respective shield element are not shown in FIG. 4A for the sake of clarity, although sensor component 36 can be, and advantageously is, associated with a second shield element which is similarly structured and functions similarly to first shield element 94.

Advantageously, the presence of the shielding assembly 92 is effective to increase the degree of resolution of the apparatus 10, for example, by at least about 50% relative to an identical apparatus without the shielding assembly 92. For example, in one embodiment of the invention, the resolution of the apparatus 10 without magnetic shield elements 94 in place may be about 1024 increments per rotation and the resolution of the apparatus 10 with magnetic shield elements 94 disposed about each of the first and second magnetic components 16 and 26 may be about 4096 increments per rotation.

The shield elements 94 may comprise any suitable material known to be useful for shielding sensitive electronic components, such as magnetic rotary encoders, from the effects of magnetic interference. In one embodiment, metals, such as carbon steel and the like, may be used as materials of construction for the shield elements or elements, such as first shield element 94.

Turning now to FIGS. 1, 2, 5 and 6, another aspect of the invention is shown. The apparatus 10 may optionally comprise a switch assembly 180 operatively coupled to at least one of the first and second rotatable elements 14, 24 and being structured to be effective in providing a signal in response to the rotation of at least one of the first and second rotatable elements 14, 24.

Figure 5:
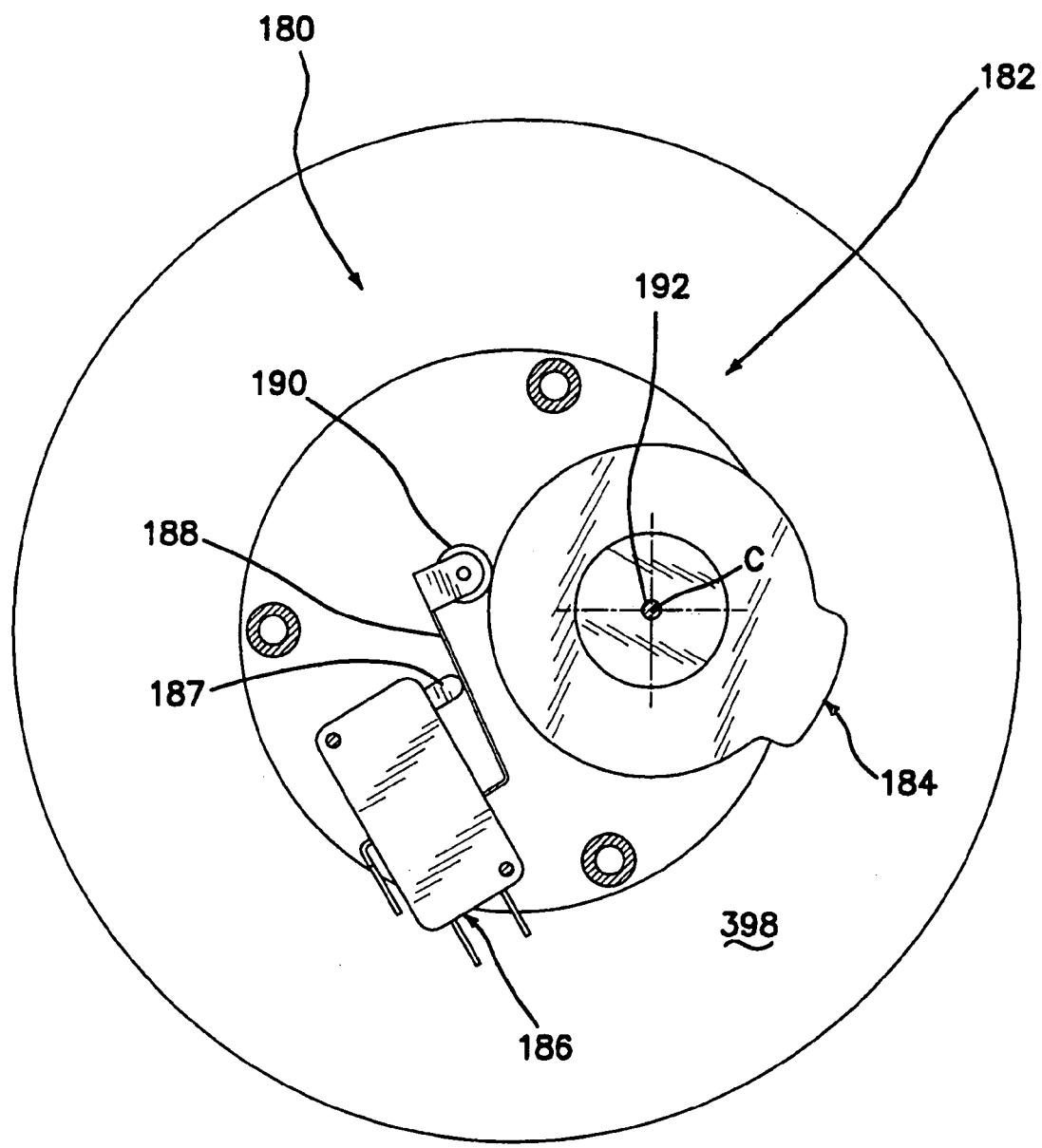
FIG. 5 is a cross-sectional plan view of the apparatus shown in FIG. 2 taken along line 5-5.

More specifically, the switch assembly 180 may comprise a first cam switch 182 including a first cam element 184 and a first switch component 186 including a first arm 188 having a first roller 190 in contact with an edge of the first cam element 184. Rotation of first cam element 184 causes first cam switch to turn on and off. The switch assembly 180 may be integrated with, or operatively coupled to, the gear assembly 80. As shown in FIG. 3, the first cam element 182 may be operatively coupled to the second rotatable element by means of third rotatable element 192 having an axis of rotation along center line C. Third rotatable element 192 rotates in response to rotation of first gear element 82 through third gear element 194 which includes gear teeth 194a which mesh with second gear teeth 86a of first gear element 82. As shown in FIG. 5, the first cam element 184 is in contact with the first roller 190 in such a position that the first switch trigger 187 is inactive, inactivated or "off".

Figure 6:
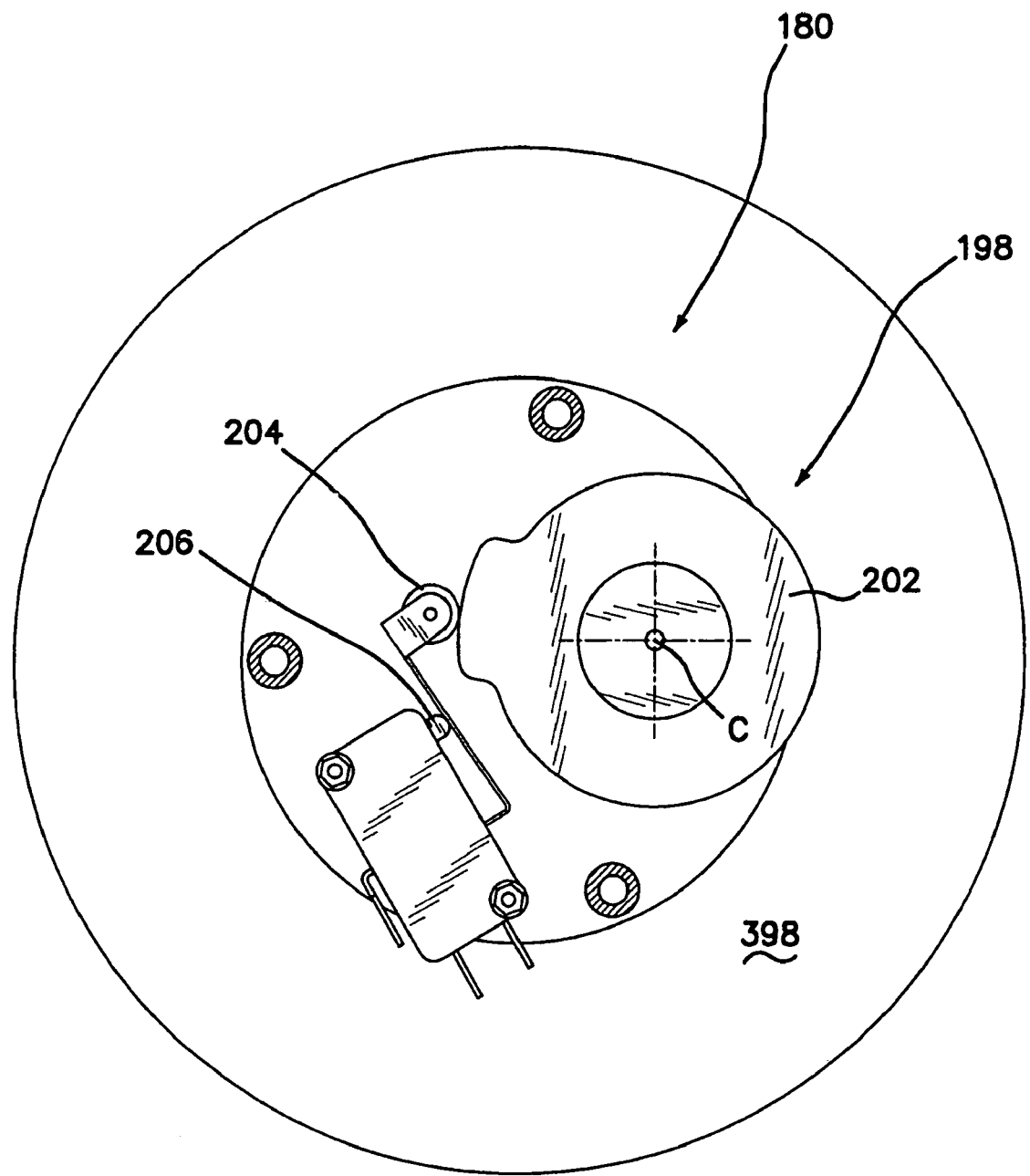
FIG. 6 is a cross-sectional plan view of the apparatus shown in FIG. 2 taken along line 6-6.

In the embodiment shown, the switch assembly 180 comprises a plurality of cam switches. For example, the switch assembly 180 may further comprise a second cam switch 198 (FIG. 6). Second cam switch 198 may be substantially identical in structure to first cam switch 182 and used for a distinct and different purpose. As shown in FIG. 6, the second cam switch 198 includes second cam element 202 which is in contact with a second roller 204 of second cam switch 198. As shown in FIG. 6, the second cam element 202 is in contact with the second roller 204 in such a position that the second switch trigger 206 is active, activated or "on", for example, activating another function, such as an alarm, as described elsewhere herein.

In other embodiments, three, four or more cam switches may be provided.

For example, the signal provided by one of first cam switch 182 and second cam switch 198 may be effective to do at least one of activate an alarm, activate a pump, alert an operator, activate a warning, activate instruction of connective action and combinations thereof. In some embodiments, the first and second cam switches 182 and 198 may be operational to provide a signal indicating when a level of liquid in the tank is outside of the range of a desired minimum and a desired maximum level.

As shown in FIG. 1, the apparatus 10 may further comprise a local data display assembly 220, in electronic communication with the data transmitter/microprocessor assembly 40, which includes a visual display screen for providing readable information regarding the absolute liquid level in the tank and other useful information for example, but not limited to, data indicating settings of the switch assembly 180.

Figure 7:
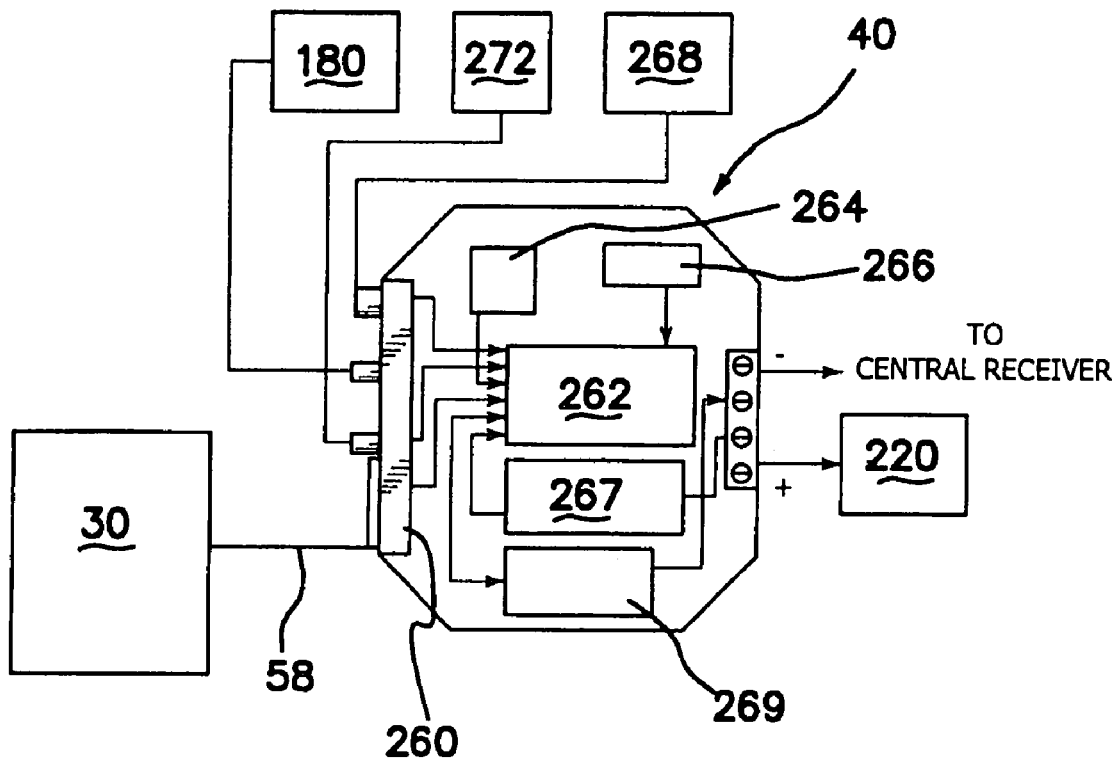
FIG. 7 is a schematic representation of a data transmitter/microprocessor assembly of the apparatus shown in FIG. 1.

Turning now to FIG. 7, a basic function of data transmitter/microprocessor assembly 40 is to receive and process the position information from first and second sensor components 34, 36, respectively, and provide an output signal to the local data display 220 and/or a central receiver reflecting the absolute value of a liquid level in the tank. Preferably, the data transmitter/microprocessor assembly 40 comprises a data transmitter/microprocessor board 226 spaced apart from the sensor assembly 30. The data transmitter/microprocessor board 226 holds the electronic components used for operating and controlling the apparatus 10. In a specific embodiment of the invention, the magnetic component position information provided from the sensor assembly 30 is passed by line 58 to the data transmitter/microprocessor assembly 40 and input into a grid 260 of data transmitter/microprocessor assembly 40.

Information from grid 260 is passed to master control chip 262 for processing to enable this information to be transmitted to the local data display assembly 220 and/or the central receiver. Master control chip 262 may also receive inputs from a timer 264, which acts to control the internal timing within data transmitter/microprocessor assembly 40 to insure effective communication with data transmitter/microprocessor assembly 40 and central receiver. The data transmitter/microprocessor assembly 40 may further include an address programmed via infrared detector 266, which includes information to identify the particular tank with which apparatus 10 is associated, and input circuits 267 which condition the signals received from the receiver prior to transmission to master control chip 262.

Master control chip 262 may also receive, via grid 260, information regarding the temperature of the liquid in the tank from a conventional temperature sensor/probe 272 located within the tank, and information regarding high liquid levels in the tank from a level alarm indicator 268, for example, associated with a conventional level sensor within the tank and/or switch assembly 180, described and shown elsewhere herein. Master control chip 262 provides output signals to output circuits 269 which condition such signals for transmission to the local data display 220 and/or the central receiver. Additional information that may be helpful for more fully understanding this aspect of the invention may be found in Jannotta, U.S. Pat. No. 4,342,996.

When the apparatus 10 is in use, for example, on a tank farm having a large number of tanks, the receiver may be programmed to send signals to data transmitter/microcontroller assembly 40 seeking liquid level information from the tanks which are associated with system 10. Because the receiver routinely asks for such information for many tanks, the receiver sends signals identifying the specific tank for which information is being sought. Master control chip 262 receives such signals, via input circuits 267, and compares the tank identification information to its address. If this comparison indicates that information is not being sought for the tank associated with apparatus 10, data transmitter/microprocessor assembly 40 will not respond to the receiver's request.

On the other hand, if this comparison indicates that information is being sought for the tank associated with apparatus 10, master control chip 262 will send, via output circuit 269, the receiver sequential information, derived from and consistent with the magnetic field information received by grid 260, from which the absolute height or level of liquid 2 in the tank 4 can be determined. Other information, such as temperature information from temperature probe, can be supplied by master control chip 262 and output circuits 269 to the central receiver upon request. The communications between the central receiver and data transmitter/microprocessor assembly 40 are designed, for example, to allow information indicating an undesirably high level of liquid in the tank, for example, from switch assembly 180, to be transmitted via master control chip 262 and output circuits 269 to the receiver at any time when requested by the receiver.

The individual components making up the data transmitter/microprocessor assembly 40, as well as many of the other individual components included in the present apparatus may be selected from well known and/or commercially available components. The present invention involves apparatus comprising combinations of individual components which, as described herein, are structured and positioned to provide highly advantageous results for example, as set forth elsewhere herein.

Information that may be helpful in gaining a better understanding of these and other aspects of the present invention may be found in Holcomb et al., U.S. Pat. No. 6,992,757; and Jannotta, U.S. Pat. No. 4,275,382, the entire disclosure of each of these documents being incorporated herein by this reference.

Returning now to FIGS. 1 and 2, the apparatus 10 is preferably structured to be compact, durable and sturdy. For example, apparatus 10 may further comprise a support structure including a first support plate 394, a second support plate 396 and a base plate 398, which may be coupled together by means of one or more support posts 399. For example, gear assembly 80 may be positioned between base plate 398 and second support plate 396. Sensor assembly 30, and first and second magnetic components 16, 26 may be positioned between first support plate 394 and second support plate 396.

The apparatus 10 may be about 4 inches in height measured from the bottom of the base plate 398 to the top of the display screen 220. The apparatus 10 may, and advantageously is, located at least partially in a housing, such as a protective housing or even an explosion-proof or explosion-resistant housing. Housings that are conventionally used with other liquid level monitoring systems may be suitable for use with the present apparatus. Each of the first support plate 394, second support plate 396, encoder board 30a and data transmitter/microprocessor board 226 may be about 2.5 inches in diameter. The encoder board 30a, data transmitter/microprocessor board 326 and data display assembly 220 may be positioned in a stacked relationship, as shown. The dimensions of the apparatus set forth herein are intended to illustrate, and not limit, the present invention.

The apparatus 10 may be calibrated at input shaft 42 such that one complete rotation or revolution of input shaft 42 and, consequently, first rotatable element 14 and first magnetic component 16, represents one (1) foot of change in the height or level of liquid in the tank. Therefore, if there are 1024 equal radial increments through which the first rotatable element 14 and first magnetic component 16 rotate in making one (1) complete revolution, than rotation through each such radial increment represents a change of about 0.012 inch in the liquid height or level in the tank. For purposes of illustration, and without limitation, assume that there are 1024 equal radial increments through which the second rotatable element 24 and second magnetic component 26 rotate in making one (1) complete revolution and rotation through each such radial increment represents a change of one-eighth foot in the level of liquid in the tank, then the apparatus 10 is able to monitor the level of liquid in a tank that itself has a height (or depth) of about 128 feet.

In any event, information, e.g., signals indicative of the absolute position of both the first and second magnetic components 16 and 26, respectively, is passed to the data transmitter/microprocessor assembly 40 so that the absolute height or level of liquid in the tank can be obtained, e.g., by data processing, monitored and/or displayed 220, as desired.

Such liquid height or level information may be displayed locally at each tank by means of the local digital display 220, for example.

Turning back to FIG. 2A, in some embodiments of the invention, a central monitoring station or receiver 420 is provided in connection with each data transmitter assembly 40 of a plurality of apparatus 10, 10a and 10b, each being associated with a different liquid storage tank. Each of apparatus 10a and 10b may be identical in function and structure to apparatus 10 described and shown elsewhere herein. The central monitoring station 420 functions to request information from individual apparatus 10, 10a, 10b, for example, periodically or on-demand, and can be used to display, monitor and/or record a liquid level or height of one or more particular storage tanks under consideration. The central monitoring station 420 may also function as the central receiver, as described elsewhere herein. It is to be appreciated that system 510 comprising a plurality of apparatus 10 such as described herein, and central monitoring station 420 is considered to be included within the scope of the invention.

Figure 8:
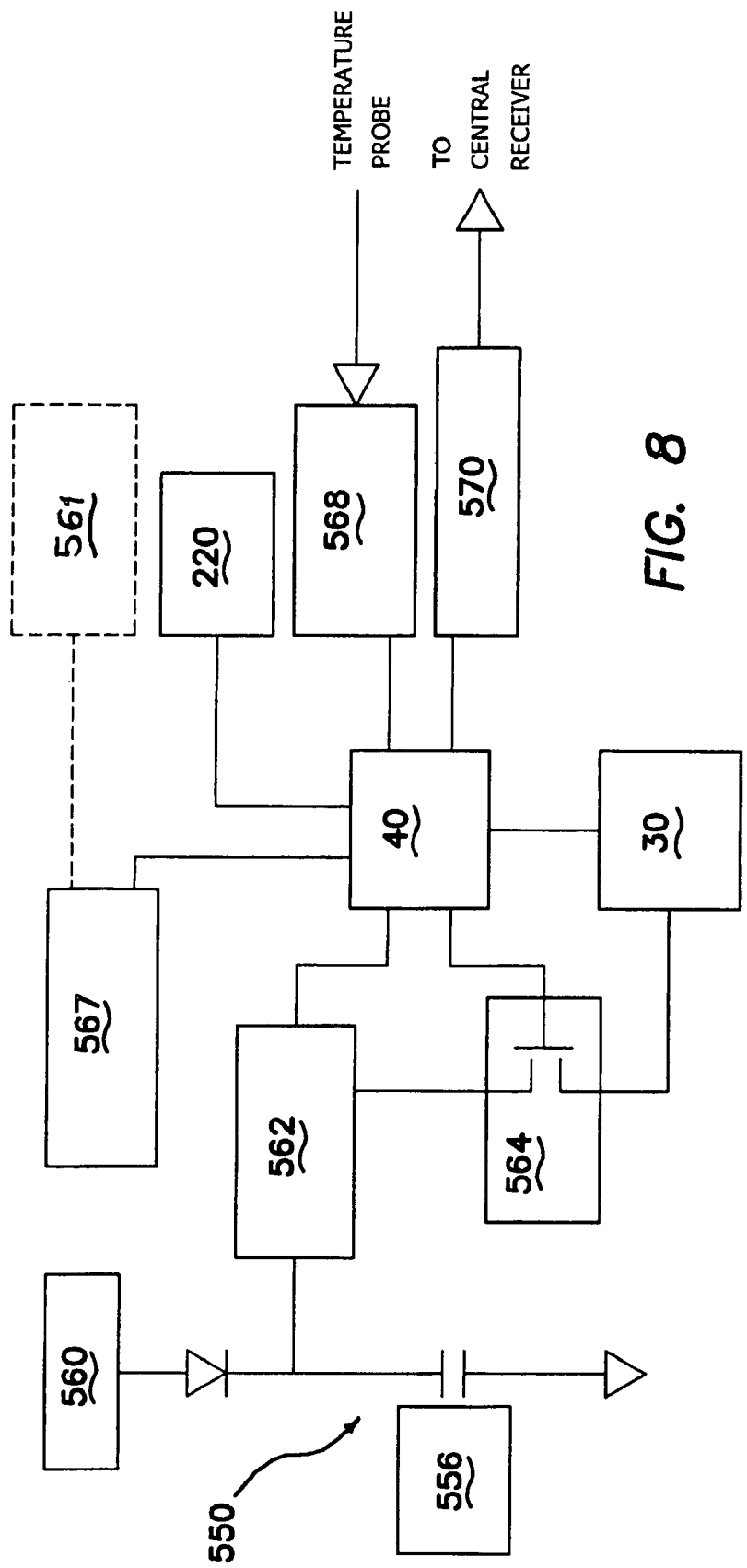
FIG. 8 is a simplified circuit flow chart of one embodiment of an apparatus in accordance with the present invention.

Turning now to FIG. 8, another aspect of the invention is shown. More particularly, in some embodiments of the invention, the apparatus 10 may include a unique power scheme for powering the sensor assembly 30. More specifically, the present apparatus may be structured to be operational using a reduced amount of power, even an almost negligible amount of power, for example, relative to an identical apparatus without the unique power scheme, for example, with the magnetic sensors being read on an intermittent basis rather than continuously. In some embodiments, the apparatus 10 is structured to operate in a low power mode and to read the magnetic sensors on an intermittent basis rather than a continuous basis.

For example, as shown in FIG. 8, the apparatus 10 may further comprise a power supply assembly 550 including a storage capacitor 556 connected to a power source 560 and a switching power supply 562 coupled thereto. Each of the first and second sensor components (not shown in FIG. 8) of the sensor assembly 30 is structured to be read, that is provide first and second signals, as described elsewhere herein, very quickly, and to be powered only intermittently. Such intermittent operation may be accomplished with a transistor switch 564 which is turned on only when the sensor components of the sensor assembly 30 are being read.

The apparatus 10 may be structured to be powered on less than about 1 milliampere (ma). Because of the exceptionally low power requirements of apparatus 10, the apparatus 10 may be run on battery power and/or solar power. For example, power source 560 may comprise a 6 volt battery which can be used to supply power to the apparatus 10 for 1, 2, 3 or more years without requiring replacement or charging of the battery. This is highly advantageous in situations where a plurality of apparatus 10 are employed, for example, in a tank farm, to reduce costs and maintenance requirements.

In addition, the apparatus 10 may require no more than 2 wires having a power output in a range of about 4.0 ma to about 20 ma.

Further, the apparatus may include an infrared sensor 567 to facilitate remote, wireless operation of individual apparatus 10 of a plurality of such apparatus being utilized at a large tank farm, as discussed elsewhere herein. The storage capacitor 556, the switching power supply 562 and the power switch 564 may be located on the data transmitter/microprocessor board 40 discussed elsewhere herein.

For example, for a typical 200 millisecond (ms) update cycle, that is the sensor components being read or updated every 200 ms, each sensor component would be on or powered for about 10 ms to about 50 ms or about 5% or less to about 25% of the total time. To further reduce power consumption, the update cycle can be lengthened, for example, so that the sensor components can be powered for about 1% or less to about 3% or about 5% of the time. The update cycle may be about 200 ms as a default value, and can be programmed using a remote controller 561 and the infrared sensor 567 discussed elsewhere herein.

The power for the apparatus 10 is stored in storage capacitor 556 and by means of a switching power supply 562 creates the necessary voltages needed for operating or powering the sensor assembly 30. By employing storage capacitor 556 and switching power supply 562, the average current consumption is very small. The switching power supply 562 takes the higher voltages present at the storage capacitor 556 and lowers them resulting in a corresponding lowering of the current drawn from the power source 560.

The data transmitter/microprocessor assembly 40 is used to control the reading of the sensor assembly 30. A temperature converter 568 may be provided to communicate to the central receiver by communication means 570 to update the local display assembly 260 and receive programming information from an infrared sensor 576. The communication means 570 may be a 2-wire 4-20ma, L&J Tankway, RS485 or other suitable communication protocol device.

In an exemplary embodiment, a remote controller 561 may be provided to be used with the infrared sensor 567 to enable programming of different values into the apparatus 10, for example, address update, scan time, units of measure, etc. This allows an operator of the apparatus 10 to point the remote controller to the infrared sensor 567 to cause a prompt to appear on the local display screen 220. Operator may scroll through the prompts until he finds a parameter he wants to change and enters new data. The data transmission/microprocessor assembly 40 remembers new values in a non-volatile memory component.

For illustrative purposes only, a typical cycle of apparatus 10 may comprise the data transmitter/microprocessor assembly 40 turning on the power switch 564 for a few milliseconds and then reading the signals from sensor assembly 30. The data transmitter/microprocessor assembly 40 would then read the temperature converter 568 and display the results on the graphical display of the display assembly 220. This information is also available at any time to be sent back to the central receiver via various communication means 570.

The entire disclosure of each of the patents, publications and documents identified herein and/or attached hereto is incorporated herein by this reference.

While this invention has been described with respect to various specific examples and embodiments, it is to be understood that the invention is not limited thereto and that it can be variously practiced within the scope of the following claims.

What is claimed is:

1. An apparatus for monitoring a height of liquid in a liquid storage tank, the apparatus comprising:
   a first rotatable element rotatable in response to a change of a liquid level in a liquid storage tank and including a first magnetic component having a first magnetic field, the first magnetic component rotates with the first rotatable element;
   a second rotatable element rotatable in response to the rotation of the first rotatable element and at a different rate of rotation than the first rotatable element and including a second magnetic component, different from the first magnetic component, having a second magnetic field, the second magnetic component rotates with the second rotatable element;

a sensor assembly comprising:
- a first sensor component located within range of the first magnetic field and structured to be effective in providing a first signal indicative of a position of the first magnetic component, and
- a second sensor component located within range of the second magnetic field and structured to be effective in providing a second signal indicative of a position of the second magnetic component; and
- a data transmitter/microprocessor assembly in electronic communication with the sensor assembly and structured to be effective in receiving the first and second signals from the first and second sensor components, respectively, and processing said first and second signals into data representing a height of liquid in a liquid storage tank.

2. The apparatus of claim 1 which further comprises a first shield element structured and positioned relative to the first magnetic component and the first sensor component to be effective in reducing magnetic interference within the first magnetic field relative to an identical apparatus without the first shield element.

3. The apparatus of claim 1 which further comprises a second shield element structured and positioned relative to the second magnetic component and the second sensor component to be effective in reducing magnetic interference within the second magnetic field relative to an identical apparatus without the second shield element.

4. The apparatus of claim 2 which further comprises a second shield element structured and positioned relative to the second magnetic component and the second sensor component to be effective in reducing magnetic interference within the second magnetic field relative to an identical apparatus without the second shield element.

5. The apparatus of claim 1 wherein at least one of the first sensor component and the second sensor component comprises a magnetic rotary encoder.

6. The apparatus of claim 1 wherein each of the first and second sensor components comprises a programmable magnetic sensor component.

7. The apparatus of claim 1 wherein each of the first and second sensor components provides a degree of resolution within at least about 0.35°.

8. The apparatus of claim 1 which further comprises a gear assembly positioned to operatively couple together the first and second rotatable elements.

9. The apparatus of claim 1 further comprising a switch assembly operatively coupled to at least one of the first and second rotatable elements and being structured to be effective in providing a signal in response to the rotation of the at least one of the first and second rotatable elements.

10. The apparatus of claim 9 wherein the switch assembly comprises a cam switch.

11. The apparatus of claim 1, wherein the data transmitter/microprocessor assembly comprises a data transmitter/microprocessor board spaced apart from the sensor assembly and the apparatus further comprises a data display assembly comprising a display screen positioned in a stacked relationship with the data transmitter/microprocessor board, the data display assembly being structured to display data representing a height of liquid in a liquid storage tank.

12. The apparatus of claim 1 wherein the first rotatable element and the second rotatable element rotate about different centerlines.

13. The apparatus of claim 1 further comprising a data display assembly comprising a display screen positioned in a stacked relationship with the data transmitter/microprocessor assembly, the data display assembly is structured to display data representing an absolute height of liquid in a liquid storage tank.

14. The apparatus of claim 1 further comprising a switching power supply assembly structured and positioned to be effective in providing power to the sensor assembly.

15. The apparatus of claim 14 further comprising a storage capacitor component in electrical communication with the switching power supply assembly.

16. The apparatus of claim 15 wherein the sensor assembly is structured to receive electrical power intermittently from the switching power supply assembly through the storage capacitor component.

17. The apparatus of claim 1 further comprising a storage capacitor component structured and positioned so that the sensor assembly receives electrical power intermittently from the storage capacitor component.

18. The apparatus of claim 1 further comprising a storage capacitor component and a switching power supply assembly structured and positioned to be effective in providing electrical power to at least one of the sensor assembly and the data transmitter/microprocessor assembly.

19. The apparatus of claim 14 further comprising a power switch structured and positioned to control the flow of electrical power between the switching power supply assembly and the sensor assembly.

20. The apparatus of claim 1, wherein the sensor assembly provides a first signal and a second signal each second during a time interval in a range of about 50 milliseconds to about 400 milliseconds.

21. The apparatus of claim 9 wherein the switch assembly comprises a plurality of cam switches.

22. The apparatus of claim 9 wherein the signal provided by the switch assembly is effective to do at least one of activate an alarm, activate a pump, alert an operator, activate a warning, activate instruction of connective action and combinations thereof.

23. The apparatus of claim 1 wherein the sensor assembly further comprises an encoder board to which the first and second sensor components are fixedly secured.

24. The apparatus of claim 1 wherein the data transmitter/microprocessor assembly comprises a data transmitter/microprocessor board spaced apart from the sensor assembly.

25. The apparatus of claim 1 which is battery powered.

26. The apparatus of claim 1 which is solar powered.

27. An apparatus for monitoring an absolute height of liquid in a liquid storage tank, the apparatus comprising:
- a rotatable element rotatable in response to a change of a liquid level in a liquid storage tank and including a magnetic component having a magnetic field;
- a sensor assembly including a magnetic sensor component located within range of the magnetic field of the magnetic component and structured to be effective in providing a signal indicative of a position of the magnetic component;
- a power supply assembly to intermittently provide power to the sensor assembly; and
- a data transmitter/microprocessor assembly in electrical communication with the sensor assembly and structured and positioned to be effective in receiving the signal from the magnetic sensor component and processing said signal into data representing an absolute height of liquid in a liquid storage tank.

28. The apparatus of claim 27 wherein the power supply assembly includes a storage capacitor component.

29. The apparatus of claim 27 wherein the power supply assembly comprises a switching power supply assembly and a storage capacitor component operatively coupled to the switching power supply assembly.

30. An apparatus for monitoring a height of liquid in a liquid storage tank, the apparatus comprising:
a first rotatable element rotatable in response to a change of a liquid level in a liquid storage tank and including a first magnetic component having a first magnetic field;
a second rotatable element rotatable in response to the rotation of the first rotatable element and including a second magnetic component having a second magnetic field;
a sensor assembly comprising:
a first sensor component located within range of the first magnetic field and structured to be effective in providing a first signal indicative of a position of the first magnetic component, and
a second sensor component located within range of the second magnetic field and structured to be effective in providing a second signal indicative of a position of the second magnetic component;
a data transmitter/microprocessor assembly in electronic communication with the sensor assembly and structured to be effective in receiving the first and second signals from the first and second sensor components, respectively, and processing said first and second signals into data representing a height of liquid in a liquid storage tank;
wherein the apparatus further comprises:
a gear assembly positioned to operatively couple together the first and second rotatable elements; and
a switch assembly operatively coupled to the gear assembly and located between an encoder board, to which the first and second sensors are fixedly secured, and the data transmitter/microprocessor assembly.

31. An apparatus for monitoring a height of liquid in a liquid storage tank, the apparatus comprising:
a first rotatable element rotatable in response to a change of a liquid level in a liquid storage tank and including a first magnetic component having a first magnetic field;
a second rotatable element rotatable in response to the rotation of the first rotatable element and including a second magnetic component having a second magnetic field;
a sensor assembly comprising:
a first sensor component located within range of the first magnetic field and structured to be effective in providing a first signal indicative of a position of the first magnetic component, and
a second sensor component located within range of the second magnetic field and structured to be effective in providing a second signal indicative of a position of the second magnetic component;
a data transmitter/microprocessor assembly in electronic communication with the sensor assembly and structured to be effective in receiving the first and second signals from the first and second sensor components, respectively, and processing said first and second signals into data representing a height of liquid in a liquid storage tank;
wherein the apparatus further comprises:
a storage capacitor component and a switching power supply assembly structured and positioned to be effective in providing electrical power to at least one of the sensor assembly and the data transmitter/microprocessor assembly.

32. An apparatus for monitoring a height of liquid in a liquid storage tank, the apparatus comprising:
a first rotatable element rotatable in response to a change of a liquid level in a liquid storage tank and including a first magnetic component having a first magnetic field;
a second rotatable element rotatable in response to the rotation of the first rotatable element and including a second magnetic component having a second magnetic field;
a sensor assembly comprising:
a first sensor component located within range of the first magnetic field and structured to be effective in providing a first signal indicative of a position of the first magnetic component, and
a second sensor component located within range of the second magnetic field and structured to be effective in providing a second signal indicative of a position of the second magnetic component; and
a data transmitter/microprocessor assembly in electronic communication with the sensor assembly and structured to be effective in receiving the first and second signals from the first and second sensor components, respectively, and processing said first and second signals into data representing a height of liquid in a liquid storage tank;
a switching power supply assembly structured and positioned to be effective in providing power to the sensor assembly; and
a power switch structured and positioned to control the flow of electrical power between the switching power supply assembly and the sensor assembly, wherein the data transmitter/microprocessor assembly is structured and positioned to be effective in controlling operation of the power switch.

33. An apparatus for monitoring a height of liquid in a liquid storage tank, the apparatus comprising:
a first rotatable element rotatable in response to a change of a liquid level in a liquid storage tank and including a first magnetic component having a first magnetic field;
a second rotatable element rotatable in response to the rotation of the first rotatable element and including a second magnetic component having a second magnetic field;
a sensor assembly comprising:
a first sensor component located within range of the first magnetic field and structured to be effective in providing a first signal indicative of a position of the first magnetic component,
a second sensor component located within range of the second magnetic field and structured to be effective in providing a second signal indicative of a position of the second magnetic component; and
a data transmitter/microprocessor assembly in electronic communication with the sensor assembly and structured to be effective in receiving the first and second signals from the first and second sensor components, respectively, and processing said first and second signals into data representing a height of liquid in a liquid storage tank;
wherein the apparatus further comprises:
a storage capacitor component and a switching power supply assembly structured and positioned to be effective in reducing electrical power consumption of the apparatus over a period of time relative to an identical apparatus without the storage capacitor component and the switching power supply assembly.

34. An apparatus for monitoring a height of liquid in a liquid storage tank, the apparatus comprising:

a first rotatable element rotatable in response to a change of a liquid level in a liquid storage tank and including a first magnetic component having a first magnetic field;

a second rotatable element rotatable in response to the rotation of the first rotatable element and including a second magnetic component having a second magnetic field;

a sensor assembly comprising:
  a first sensor component located within range of the first magnetic field and structured to be effective in providing a first signal indicative of a position of the first magnetic component, and
  a second sensor component located within range of the second magnetic field and structured to be effective in providing a second signal indicative of a position of the second magnetic component;

a data transmitter/microprocessor assembly in electronic communication with the sensor assembly and structured to be effective in receiving the first and second signals from the first and second sensor components, respectively, and processing said first and second signals into data representing a height of liquid in a liquid storage tank; and wherein the data transmitter/microprocessor assembly is structured to use the position indicated by at least one of the first signal and the second signal to adjust the value of the height of liquid in the liquid storage tank to a different value relative to the value provided by the positions indicated by the first signal and the second signal without said adjustment.

* * * * *